United States Patent Office 3,823,124
Patented July 9, 1974

3,823,124
POLYMERS OF PHOSPHORUS-CONTAINING MONOMERS
Wen-Hsuan Chang and Rostyslaw Dowbenko, Gibsonia, Pa., and Carl C. Anderson, Hartland, Wis., assignors to PPG Industries, Inc., Pittsburgh, Pa.
No Drawing. Application Apr. 27, 1972, Ser. No. 248,294, now Patent No. 3,763,108, which is a continuation-in-part of abandoned application Ser. No. 29,309, Apr. 16, 1970. Divided and this application June 20, 1973, Ser. No. 371,919
Int. Cl. C08f 3/90, 15/02
U.S. Cl. 260—89.7 R      6 Claims

ABSTRACT OF THE DISCLOSURE

Phosphorous-containing monomers are prepared by reacting unsaturated amides with aldehydes and trialkyl phosphites. The resulting monomers can be polymerized to form a fire-retardant resin which may be used as a pressure-sensitive adhesive.

CROSS REFERENCE TO RELATED APPLICATIONS

This application is a divsional application of Application Ser. No. 248,294, filed Apr. 27, 1972, now U.S. Pat. No. 3,763,108, which in turn is a continuation-in-part of Application Ser. No. 29,309, filed Apr. 16, 1970, and now abandoned.

BACKGROUND OF THE INVENTION

This invention relates to novel phosphorous-containing monomers and to methods for the preparation thereof and pertains particularly to polymers formed from these monomers. These polymers form coating compositions which have outstanding physical properties such as toughness, stain resistance, and fire-retardancy.

The novel monomers produced in accordance with this invention generally have the formula:

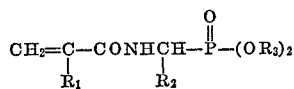

wherein $R_1$ is selected from the group consisting of H, halo and alkyl radicals. $R_2$ is selected from the group consisting of H, aralkyl radicals, alkyl radicals, and substituted alkyl such as haloalkyl radicals and $R_3$ is selected from the group consisting of alkyl, aryl substituted alkyl and substituted aryl groups. The radical $R_1$ may be hydrogen, halo such as chloro or bromo or an alkyl radical such as methyl or ethyl. The preferred alkyl radicals contain up to about 8 carbon atoms. The radical $R_2$ if preferably H but may also be aralkyl or substituted and unsubstituted alkyl radicals. The alkyl radicals may generally be of any length such as methyl, ethyl, propyl, isopropyl, butyl, octyl, decyl, chloromethyl, and the like. Examples of aralkyl groups are phenyl ethyl, phenyl propyl, benzyl, diphenyl methyl, xylyl, phenyl octyl, and the like. The preferred aralkyl and alkyl radicals contain up to about 12 carbon atoms. The radical $R_3$ may be any alkyl radical such as methyl, ethyl, propyl, chloroethyl, chloropropyl, isopropyl, butyl, octyl, and the like, or any aryl radical such as phenyl, tolyl, or the like. The preferred alkyl and aryl radicals contain up to about 8 carbon atoms. The alkyl and aryl radicals may also be substituted with groups such as halogens and nitrogen-containing groups. Examples of these are chloro, bromo, nitro, cyano, aceto, carboalkoxy, and carbamido groups.

The novel monomers are formed by reacting an unsaturated amide with an aldehyde and a trialkyl phosphite.

The amide may be any unsaturated amide such as acrylamide, methacrylamide, crotonamide, itaconic diamide, maleamic acid, and esters thereof, and N-carbonyl maleamide. The preferred amides are acrylamide and methacrylamide.

Any aldehyde may be used to react with the amide and phosphite. The preferred aldehyde is formaldehyde or a formaldehyde-yielding substance such as paraformaldehyde or trioxymethylene. However, other monoaldehydes such as acetaldehyde, butyraldehyde, furfural, chloral, and the like, may be used. The preferred aldehydes have the formula $R_2CHO$, wherein $R_2$ is as described above.

The phosphite reacted with the amide and aldehyde may be any trialkyl phosphite such as trimethyl phosphite, triethyl phosphite, and the like. The preferred trialkyl phosphites contain up to 8 carbon atoms. The trialkyl phosphite may also be substituted with groups such as halogen and $NO_2$. Examples of these phosphites are tris(chloropropyl)phosphite, tris(cyanoethyl)phosphite, tris(nitroethyl) phosphite, and the like.

Generally the phosphites used may be represented by the formula $P(OR_3)_3$, wherein $R_3$ is as described above.

The three components may be reacted using a wide range of proportions of the reactants. However, it is preferred to use approximately equimolar amounts of the unsaturated amide, aldehyde, and phosphite.

The reaction may be carried out by first reacting the unsaturated amide with the aldehyde and subsequently reacting in the product with the phosphite.

The amide-aldehyde reaction is carried out in the presence of heat and in alkaline conditions. If the reaction is carried out under basic conditions, no catalyst is required. If a catalyst is used, it may be sodium hydroxide, potassium alkoxide, sodium carbonate or potassium hydroxide. Preferably the reaction is run at about 40° C. or higher and at a pH of about 8 to 10 determined by pH paper.

The reaction product is neutralized and the phosphite is added slowly. Although the reaction is exothermic, some heating is desirable to make the reaction go to completion.

The novel monomers prepared in the manner illustrated above may be homopolymerized or interpolymerized with other monomers to form polymers which are suitable for use as coatings, adhesives, potting compounds, and the like.

The polymerization may be carried out most readily in a solvent under refluxing temperatures. Butanol has proved to be a satisfactory solvent in most cases, as can many of the alcohols and aromatic hydrocarbons generally used for this purpose.

In carrying out the polymerization reaction, a peroxygen type catalyst is ordinarily utilized. Useful catalysts for this purpose include acetyl peroxide, benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chloro-benzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions. The diazo compounds such as alpha-alphaazo-di-isobutyronitrile or p-methoxyphenyl diazothio-(2-naphthyl)ether, may also be used as polymerization catalysts. Redox catalyst systems can also be employed.

The quantity of catalyst employed can be varier considerably in order to regulate the molecular weight of the polymer; however, in most instances, it is desirable to utilize from about 0.1 percent to 2.0 percent by weight of the monomeric components. If higher molecular weight products are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

A chain-modifying agent or chain terminator may be added to the mixture if desired. The use of a lower alkanol such as butanol or a mixture of butanol and water as a solvent, together with high catalyst levels, helps considerably, but in most instances it is preferred to add controlled amounts of chain-modifying materials. The mercaptans, such as dodecyl mercaptan, tertiary dodecyl mercaptan, octyl mercaptan, hexyl mercaptan, mercaptoethanol, mercaptoacetic acid, and the like, are conventionally used for this purpose. However, other chain-modifying agents such as cyclopentadiene, allyl acetate, allyl carbamate, alpha-methyl styrene dimers, and alpha-methyl styrene itself can be used to secure low molecular weights, as can unsaturated fatty acids or esters. Aromatic hydrocarbons in the reaction mixture also are of assistance in maintaining low molecular weight.

The polymerization is best carried out by admixing the monomer and the other monomers, if desired, with the catalyst and chain-modifying agent, if any, in the solvent, and refluxing the resulting solution for a time sufficient to obtain the desired conversion. Ordinarily, the polymerization time will be from about one hour to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization because of the very rapid reaction rate. Good agitation is also desirable.

The polymers may be used to form coating compositions which have excellent pressure-sensitive adhesives. These materials may be applied to substrates by any of the conventional methods such as dip coating, brushing, roll coating, spraying, etc.

The following examples set forth specific embodiments of the instant invention, however, the invention is not to be construed as being limited to these embodiments for there are, of course, numerous possible variations and modifications. All parts and percentages in the examples as well as throughout the specification are by weight unless otherwise indicated.

EXAMPLE 1

A vessel was charged with 1,000 millilitiers of xylene and 100 milliliters of methanol. To the vessel was then added slowly at 50° C. 710 grams of acrylamide and 330 grams of formaldehyde. The pH of the reactants was maintained at 8 by adding 50 percent sodium hydroxide solution at various times. The reactants were cooked at 50° C. for 3 hours. After the reaction mixture was neutralized with phosphoric acid to a pH of 7, 2 grams of hydroquinone were added. The product was vacuum distilled to remove 800 grams of distillate. Two thousand grams of tris(chloropropyl)phosphite were added at 45° C. over a period of 5 hours. The exotherm brought the temperature of the reactants up to about 105° C. The solvent was again removed by vacuum and 3,000 grams of the final product were obtained as the pot residue. The acid value of the monomer was 1.69, the Gardner-Holdt viscosity was Z 5-, the color was A–S, and the ash was 8.2 parts per million. The resultant monomer had the formula:

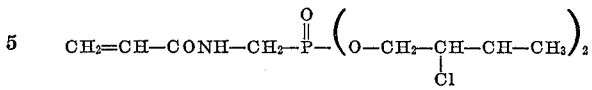

EXAMPLE 2

A vessel was charged with 100 milliliters of xylene, 20 milliliters of methanol, 71 grams of acrylamide and 31 grams of formaldehyde. To the reactants were added 10 drops of a 50 percent aqueous solution of sodium hydroxide and the reactants were heated at 50° C. for two hours. The product was neutralized with phosphoric acid until it was neutral to wet pH paper and then vacuum distilled to remove solvents. To the reactants were then added 0.1 gram of hydroquinone and 125 grams of trimethyl phosphite. The reactants were heated at from about 50° C. to about 100° C. for 1½ hours. The resulting product had the formula:

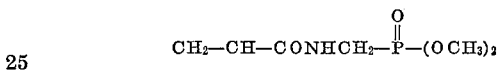

EXAMPLE 3

A permanently tacky, non-burning, pressure-sensitive adhesive was prepared in the following manner.

To a flask was added 957 parts of deionized water, 6.3 parts of a cellulosive protective colloid (Natrasol 250 J), 81.1 parts of surface active agents, and 6 parts of potassium persulfate. The flask was heated to 75° C. and 45 parts of a mixture of 600 grams of bis-(2-chloropropyl) N-acrylamidomethylphosphonate, 120 grams of methyl methacrylate, 60 grams of 2-ethylhexyl acrylate and 0.3 grams of tertiary dodecyl mercaptan were added. An additional 740 parts of the mixture was added incrementally over a 2-hour period at 80° C. The mixture was then cooled and 60 parts of deionized water and 6 parts of sodium carbonate were added and the mixture kept at 32° C. for one hour.

The resulting interpolymer had a total solids content of 32.6 and a Williams' plasticity number of 2.90.

The above interpolymer was tested by drawing down on a fiberglas mat and baking to form a film. The film was cut into 1 inch-by-12 inch strips and held over a Bunsen burner for 10 seconds. When the film pulled away from the flame, the fire was extinguished.

Thus, it is seen that a good tacky, pressure-senstive adhesive which is fire-retardant is formed using the method of this invention.

Although specific examples have been set forth above, it is not intended that the invention be limited solely thereto but to include all of the variations and modifications following within the scope of the appended claims.

What is claimed is:

1. The polymer formed by polymerizing a composition having the formula:

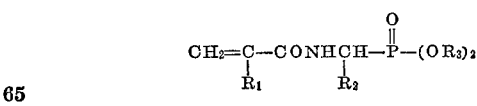

wherein $R_1$ is selected from the group consisting of H, halo, and alkyl radicals containing up to about 8 carbon atoms, $R_2$ is selected from H, aralkyl radicals containing up to about 12 carbon atoms, alkyl radicals containing up to about 12 carbon atoms and halo, nitro, cyano, aceto, carboalkoxy and carbamido substituted alkyl groups containing up to about 12 carbon atoms and $R_3$ is selected from the group consisting of alkyl radicals containing up to about 8 carbon atoms and halo, nitro, cyano, aceto, carboalkoxy and carbamido substituted alkyl radicals containing up to about 8 carbon atoms.

2. The polymer of Claim 1, wherein $R_1$ is hydrogen.

3. The polymer of Claim 1, wherein $R_1$ is a methyl group.

4. The polymer of Claim 1, wherein $R_2$ is hydrogen.

5. The polymer of Claim 1, wherein $R_3$ is a methyl group.

6. The polymer of Claim 1, wherein $R_3$ is a chloropropyl group.

References Cited

UNITED STATES PATENTS 3,346,545  10/1967  Sehm ---------- 260—89.7 R
3,351,617  11/1967  Jaeger et al. ------ 260—89.7 R HARRY WONG, Jr., Primary Examiner U.S. Cl. X.R.

117—122, 161; 161—167; 260—78.4 R, 80 PS, 80.3 N, 85.5 A, 85.5 N, 88.7 A, 88.7 E, 944